United States Patent
Dorn et al.

(10) Patent No.: US 11,645,128 B2
(45) Date of Patent: May 9, 2023

(54) COMPUTER-IMPLEMENTED METHOD FOR PROVIDING CROSS-LINKING BETWEEN CLOUD-BASED WEB-APPLICATIONS

(71) Applicant: Siemens Healthcare GmbH, Erlangen (DE)

(72) Inventors: Karlheinz Dorn, Kalchreuth (DE); Andreas Falkner, Nuremberg (DE)

(73) Assignee: Siemens Healthcare GmbH, Erlangen (DE)

( * ) Notice: Subject to any disclaimer, the term of this patent is extended or adjusted under 35 U.S.C. 154(b) by 0 days.

(21) Appl. No.: 16/872,853

(22) Filed: May 12, 2020

(65) Prior Publication Data

US 2020/0371852 A1     Nov. 26, 2020

(30) Foreign Application Priority Data

May 21, 2019   (EP) .................................... 19175672
May 23, 2019   (EP) .................................... 19176243

(51) Int. Cl.
  *G06F 40/134*     (2020.01)
  *G06F 16/95*      (2019.01)
  (Continued)

(52) U.S. Cl.
  CPC ............ *G06F 9/547* (2013.01); *G06F 3/0484* (2013.01); *G06F 9/44521* (2013.01);
  (Continued)

(58) Field of Classification Search
  CPC .. G06F 3/04883; G06F 13/14; G06F 16/9566; G06F 40/134; G06F 9/547;
  (Continued)

(56) References Cited

U.S. PATENT DOCUMENTS 8,176,411 B2\* 5/2012 Palmieri ................. G06F 16/95
                                                                     715/205
8,745,539 B2\* 6/2014 Singh ...................... G06F 9/461
                                                                     715/825

(Continued)

OTHER PUBLICATIONS

Wikipedia: "URL"; pp. 1-4, available at: https://en.wikipedia.org/w/index.php?title=URL&oldid=896012780, published: Jul. 12, 2019.

(Continued)

*Primary Examiner* — Scott T Baderman
*Assistant Examiner* — Mario M Velez-Lopez
(74) *Attorney, Agent, or Firm* — Harness, Dickey & Pierce, P.L.C.

(57) ABSTRACT

A computer-implemented method is for providing cross-linking between cloud-based web-applications. A consumer web-application calls a Uniform Resource Locator, URL, implemented in a customized provider webpage of a provider web-application to activate the customized provider webpage of the provider web-application via a cross link, the URL, including an URL extension with additional URL parameters to provide autonavigation to a customized specific internal view of the activated provider webpage. The customized specific internal view of the activated provider webpage is opened automatically on top of the calling web-application until the activated provider webpage is closed in response to a corresponding user command input via a user interface. The last state and context of the calling consumer web-application is kept and is used to restore automatically the original calling consumer web-application after the provider webpage of the provider web-application is closed.

20 Claims, 2 Drawing Sheets

(51) Int. Cl.
  *G06F 9/54*    (2006.01)
  *G06F 16/955*  (2019.01)
  *G06F 40/143*  (2020.01)
  *G06F 3/0484*  (2022.01)
  *G06F 9/445*   (2018.01)
  *H04L 67/02*   (2022.01)
  *H04L 67/75*   (2022.01)
  *G06F 3/0482*  (2013.01)

(52) U.S. Cl.
  CPC ...... *G06F 16/9558* (2019.01); *G06F 16/9566* (2019.01); *G06F 40/134* (2020.01); *G06F 40/143* (2020.01); *H04L 67/02* (2013.01); *H04L 67/75* (2022.05); *G06F 3/0482* (2013.01)

(58) Field of Classification Search
  CPC .. G06F 16/9558; G06F 40/143; G06F 3/0484; G06F 9/44521; G06F 3/0482; H04L 67/02; H04L 67/36; H04L 67/75
  See application file for complete search history.

(56) References Cited

U.S. PATENT DOCUMENTS

| | | | | |
|---|---|---|---|---|
| 8,793,620 | B2* | 7/2014 | Stafford | G06F 3/04842 715/858 |
| 2006/0184566 | A1* | 8/2006 | Lo | G06F 16/48 707/999.102 |
| 2006/0253799 | A1* | 11/2006 | Montroy | G06F 16/958 707/E17.116 |
| 2006/0259873 | A1* | 11/2006 | Mister | G06F 21/83 715/781 |
| 2007/0136579 | A1* | 6/2007 | Levy | H04L 63/102 713/168 |
| 2009/0177771 | A1* | 7/2009 | Britton | G06Q 30/0256 709/224 |
| 2009/0228779 | A1* | 9/2009 | Williamson | H04L 67/289 715/205 |
| 2012/0084680 | A1* | 4/2012 | Gimpl | G06F 1/1647 715/761 |
| 2012/0290724 | A1* | 11/2012 | Noro | H04L 61/4511 709/225 |
| 2014/0215316 | A1* | 7/2014 | Guo | G06F 40/14 715/241 |
| 2015/0106870 | A1* | 4/2015 | Li | G06F 21/54 726/1 |
| 2018/0218006 | A1* | 8/2018 | Palmer | G06F 16/178 |
| 2020/0135321 | A1* | 4/2020 | Lebrun | G06F 21/33 |

OTHER PUBLICATIONS

Extended European Search Report for European Application No. 19176243.4 dated Jul. 22, 2019.
European Office Action for European Application No. 19176243.4 dated Apr. 20, 2020.
European Summons to Attend Oral Hearing dated Jan. 12, 2021.
Purdila, Adi: "The Best Way to Use Pop-Ups (Modals) in Your Web Design"; envatotuts+; Apr. 10, 2019 (Apr. 10, 2019), pp. 1-1, XP055879430; Retrieved from the Internet: URL:https://webdesign.tutsplus.com/tutorials/the-best-way-to-usepop-ups-modals-in-your-web-design--cms-33070.

* cited by examiner

COMPUTER-IMPLEMENTED METHOD FOR PROVIDING CROSS-LINKING BETWEEN CLOUD-BASED WEB-APPLICATIONS

PRIORITY STATEMENT

This application claims priority under 35 U.S.C. § 119 to European Patent Application numbers EP 19175672.5 filed on May 21, 2019 and EP 19176243.4 filed on May 23, 2019, the contents of which are herein incorporated by reference in their entirety.

FIELD

Embodiments of the invention generally relate to a computer-implemented method for providing cross-linking between cloud-based web-applications in particular to a cross-linking mechanism providing parametric activation on cloud-based web-applications as well as their optimization in terms of presentation and context protection.

BACKGROUND

In computing, a web-application is a cloud based client-server computer program which the client runs in a web browser. Web-applications comprise one or more webpages. A webpage is a document commonly written in HTML (Hyper Text Markup Language) and is accessible through the internet or other networks using a browser. A webpage can be accessed by entering a Uniform Resource Locator, URL, address and may contain text, graphics and hyperlinks to other webpages and files. A web-based application is a program that can be accessed over a network connection using HTTP. The invention is focusing on the client part of the web-application (HTML5 frontend).

In conventional systems there is no cross-linking available between cloud-based web-applications. In contrast, each web-application starts from an outermost view and a user has to navigate manually to a specific internal view via manual interaction using a user interface. Moreover, after manual navigation to the other cloud-based web-application has been performed by the user, navigating back to the last state of the original web-application is not possible because the original context and state has been lost and has to be re-established by another time-consuming manual interaction process. This makes it cumbersome for a user to open a new web-application on top of an existing web-application in order to check for instance a specific detail.

In a conventional system, a user of a web-application has to navigate manually deep into the specific web-application in order to get the requested specific details. Moreover, switching back to the original web-application, from a specifically activated web-application later on opens the original application in a state such that the original view before the switch to the other application has to be manually reconstructed again. Since the original application context has been lost, it is difficult in many cases for the user to get back the state as it was before calling the other web-application. The loss of the context and state of the original calling application can be confusing for the user because the user more than often does not remember the last state and/or context of the original web-application.

Furthermore, a manual activation of another application from an original web-application forms a hurdle because of missing parameter sets to specify the desired specific view of the destination web-application. Consequently, it requires a lot of interaction of the user with the user interface to achieve a proper view on the destination web-application which is very ponderous and time-consuming.

SUMMARY

At least one embodiment of the present invention provides a method for cross-linking between cloud-based web-applications which allows a user to navigate more efficiently forth and back between web-applications and to retrieve specific context relevant full view or a subset view of information from the web-applications in a shorter time span.

At least one embodiment of the present invention is directed to a computer-implemented method for providing cross-linking between cloud-based web-applications.

In the computer-implemented method of at least one embodiment of the present invention, for providing cross-linking between cloud-based (in particular HTML5) web-applications, a consumer web-application calls a Uniform Resource Locator, URL, implemented in a customized so called provider webpage of a so called provider web-application to activate the customized provider webpage of the provider web-application via a so called cross-link (or: cross-linking principle mechanism), the Uniform Resource Locator, URL, comprises an URL extension with a set of additional URL parameters to provide (preferably dynamic configurable) autonavigation to a customized specific internal view of the activated provider webpage by the calling so called consumer web-application, and the customized specific internal view of the activated provider webpage is opened automatically (specifically via the cross-linking principle mechanism) on top of the calling web-application until the activated provider webpage is closed in response to a corresponding user command input (e.g. pressing a close button of a slide-in window hosting the provider webpage on top of the screen) via a user interface. and wherein (in particular when the slide-in window disappears) the last state and context of the calling consumer web-application is kept as before the activation of the customized provider webpage of the provider web-application (in particular via the parameterized URL) and is used to restore (or: recover) automatically the original calling consumer web-application after the provider webpage of the provider web-application is closed.

At least one embodiment of the invention provides according to the second aspect a web-application comprising at least one webpage including program code adapted to perform the computer-implemented cross-linking method according to any embodiment of the first aspect of the present invention.

At least one embodiment of the invention also provides, according to a third aspect, the invention provides a non-transient computer-readable data storage medium comprising executable program code configured to, when executed, perform the method according to any embodiment of the first aspect of the present invention.

At least one embodiment of the invention also provides, according to a fourth aspect, a computer program product comprising executable program code configured to, when executed, perform the method according to any embodiment of the first aspect of the present invention.

At least one embodiment of the invention further provides, according to a fifth aspect, a data stream comprising, or configured to generate, executable program code configured to, when executed, perform the method according to any embodiment of the first aspect of the present invention.

At least one embodiment of the invention also provides, according to a sixth aspect, a server, and/or specifically a cloud computing platform, hosting a web service provided by at least one web-application according to the second aspect of the present invention.

At least one embodiment of the invention also provides a computer-implemented method for providing cross-linking between cloud-based HTML5 web-applications, the computer-implemented method comprising:

activating, by a consumer web-application calling a Uniform Resource Locator (URL) implemented in a customized provider webpage of a provider web-application, the customized provider webpage of the provider web-application, via a cross link;

providing dynamic configurable autonavigation to a customized specific internal view of the activated provider webpage by the calling of the consumer web-application, the URL including an URL extension with a set of additional URL parameters;

automatically opening the customized specific internal view of the activated provider webpage, on top of the calling consumer web-application, until the activated provider webpage is closed in response to a corresponding user command input, via a user interface (UI), a last state and context of the calling consumer web-application being kept before the activation of the customized provider webpage of the provider web-application; and automatically restoring, using the last state and context of the calling consumer web-application, an original calling consumer web-application after the provider webpage of the provider web-application is closed.

BRIEF DESCRIPTION OF THE DRAWINGS

In the following possible embodiments of the different aspects of the present invention are described in more detail with reference to the enclosed figures.

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

In the computer-implemented method of at least one embodiment of the present invention, for providing cross-linking between cloud-based (in particular HTML5) web-applications, a consumer web-application calls a Uniform Resource Locator, URL, implemented in a customized so called provider webpage of a so called provider web-application to activate the customized provider webpage of the provider web-application via a so called cross-link (or: cross-linking principle mechanism), the Uniform Resource Locator, URL, comprises an URL extension with a set of additional URL parameters to provide (preferably dynamic configurable) autonavigation to a customized specific internal view of the activated provider webpage by the calling so called consumer web-application, and the customized specific internal view of the activated provider webpage is opened automatically (specifically via the cross-linking principle mechanism) on top of the calling web-application until the activated provider webpage is closed in response to a corresponding user command input (e.g. pressing a close button of a slide-in window hosting the provider webpage on top of the screen) via a user interface. and wherein (in particular when the slide-in window disappears) the last state and context of the calling consumer web-application is kept as before the activation of the customized provider webpage of the provider web-application (in particular via the parameterized URL) and is used to restore (or: recover) automatically the original calling consumer web-application after the provider webpage of the provider web-application is closed.

As a consequence, at least one embodiment of the inventive method saves a lot of time for the user because otherwise they would need to deeply navigate interactively into the provider web-application just to get the detailed view needed, and afterwards they would need to navigate back to the interrupted view on the consumer web-application.

The method of at least one embodiment allows an optimized deep collaboration of complete web-applications as well as individual webpages of such web-applications which are implementing different disjunct KPIs and are therefore not tightly coupled together but are only sharing restricted domain contexts where a crosslinked view between them has a huge potential to enhance domain specific tasks in a highly efficient way.

In a possible embodiment of the computer-implemented method according to the first aspect of the present invention, the cross-linking between cloud-based web-applications is provided between webpages hosted by the same web-application (so-called "App-internal cross-linking"), i.e. this web-application forms a consumer web-application as well as a provider web-application.

In a further possible embodiment of the computer-implemented method according to the first aspect of the present invention, the cross-linking between cloud-based web-applications is provided between webpages hosted by different web-applications (so-called "App-external cross-linking").

In a further possible embodiment of the computer-implemented method according to the first aspect of the present invention, the activated customized provider webpage of the provider web-application calls in turn a Uniform Resource Locator, URL, of another provider web-application activating a customized provider webpage of the other provider web-application to provide a nested cross-linking of the web-applications. In other words, the provider web-application may itself function as a consumer web-application as well.

In a further possible embodiment of the computer-implemented method according to the first aspect of the present invention, the consumer web-application provides an activation mechanism used by a user of the consumer web-application to call the Uniform Resource Locator, URL, with the URL extension.

In a further possible embodiment of the computer-implemented method according to the first aspect of the present invention, the consumer web-application provides an activation mechanism used by a user of the consumer web-application to call the Uniform Resource Locator, URL, with the URL extension and such forming a chain of URL based HTML5 based frontend components reaching from the URL for the BaseApplication over contained web-applications down to webpages within a specific web-application all reachable via extending and parameterizing the URL depending on the level to be displayed within the container's iframe.

In a further possible embodiment of the computer-implemented method according to the first aspect of the present invention, the activation mechanism comprises a hyperlink on a webpage of the consumer web-application or a menu entry in a user interface option menu of the consumer web-application.

In a further possible embodiment of the computer-implemented method according to the first aspect of the present invention, the activated provider webpage opened on top of the calling consumer web-application provides user interaction with a user via the user interface. For example, a slide-in window contains an iframe to render the URL and e.g. provides a close button to stop the lifetime of the top-level provider component.

In a still further possible embodiment of the computer-implemented method according to the first aspect of the present invention, if the customized specific internal view of the activated provider webpage opened on top of the calling consumer web-application is closed in response to a corresponding user command input by the user via the user interface, the customized specific internal view of the activated provider webpage is automatically removed from a screen of the user interface and the restored (or: recovered) original consumer web-application is automatically displayed again on the screen of the user interface.

In a further possible embodiment of the computer-implemented method according to the first aspect of the present invention, the provider webpage of the provider web-application customized by the Uniform Resource Locator, URL, via the URL extension is hosted in a runtime container displayed on a screen of the user interface.

In a further possible embodiment of the computer-implemented method according to the first aspect of the present invention, the runtime container forwards the URL parameters of the URL extension into the hosted provider webpage to provide the customized specific internal view of the provider webpage.

In a further possible embodiment of the computer-implemented method according to the first aspect of the present invention, the runtime container displayed on a screen of the user interface comprises a pop-up window, an embedded window or a browser page.

In a further possible embodiment of the computer-implemented method according to the first aspect of the present invention, the runtime container displayed on the screen of the user interface is closed in response to a corresponding user command input by the user interface.

In a further possible embodiment of the computer-implemented method according to the first aspect of the present invention, the runtime container comprises an inline frame (or "i-frame" for short) for a HTML5 web-application which can be configured by a parametrized URL which then renders its content within the contained iframe.

In a further possible embodiment of the computer-implemented method according to the first aspect of the present invention, the runtime container comprises an i-frame for a HTML5 web-application to separate the consumer web-application from the provider web-application such that their runtime and data contexts are separated from each other.

In a further possible embodiment of the computer-implemented method according to the first aspect of the present invention, the (optional) set of URL parameters of the URL extension comprises key-value pairs separated from each other by predefined separation characters. The original URL without parameters renders the default application without customized views.

At least one embodiment of the invention further provides according to a second aspect a web-application.

At least one embodiment of the invention provides according to the second aspect a web-application comprising at least one webpage including program code adapted to perform the computer-implemented cross-linking method according to any embodiment of the first aspect of the present invention.

At least one embodiment of the invention also provides, according to a third aspect, the invention provides a non-transient computer-readable data storage medium comprising executable program code configured to, when executed, perform the method according to any embodiment of the first aspect of the present invention.

The non-transient computer-readable data storage medium may comprise, or consist of, any type of computer memory, in particular semiconductor memory such as a solid-state memory. The data storage medium may also comprise, or consist of, a CD, a DVD, a Blu-Ray-Disc, an USB memory stick or the like.

At least one embodiment of the invention also provides, according to a fourth aspect, a computer program product comprising executable program code configured to, when executed, perform the method according to any embodiment of the first aspect of the present invention.

At least one embodiment of the invention further provides, according to a fifth aspect, a data stream comprising, or configured to generate, executable program code configured to, when executed, perform the method according to any embodiment of the first aspect of the present invention.

At least one embodiment of the invention also provides, according to a sixth aspect, a server, and/or specifically a cloud computing platform, hosting a web service provided by at least one web-application according to the second aspect of the present invention.

In systems based on cloud computing technology, a large number of devices is connected to a cloud computing system via the Internet. The devices may be located in a remote facility connected to the cloud computing system. For example, the devices can comprise, or consist of, equipments, sensors, actuators, robots, and/or machinery in an industrial set-up(s). The devices can be medical devices and equipments in a healthcare unit. The devices can be home appliances or office appliances in a residential/commercial establishment.

The cloud computing system may enable remote configuring, monitoring, controlling, and maintaining connected devices (also commonly known as 'assets'). Also, the cloud computing system may facilitate storing large amounts of data periodically gathered from the devices, analyzing the large amounts of data, and providing insights (e.g., Key Performance Indicators, Outliers) and alerts to operators, field engineers or owners of the devices via a graphical user interface (e.g., of web-applications). The insights and alerts may enable controlling and maintaining the devices, leading to efficient and fail-safe operation of the devices. The cloud computing system may also enable modifying parameters associated with the devices and issues control commands via the graphical user interface based on the insights and alerts.

The cloud computing system may comprise a plurality of servers or processors (also known as 'cloud infrastructure'), which are geographically distributed and connected to each other via a network. A dedicated platform (hereinafter referred to as 'cloud computing platform') is installed on the servers/processors for providing above functionality as a service (hereinafter referred to as 'cloud service'). The cloud computing platform may comprise a plurality of software programs executed on one or more servers or processors of the cloud computing system to enable delivery of the requested service to the devices and its users.

One or more application programming interfaces (APIs) are deployed in the cloud computing system to deliver various cloud services to the users.

Figure 1:
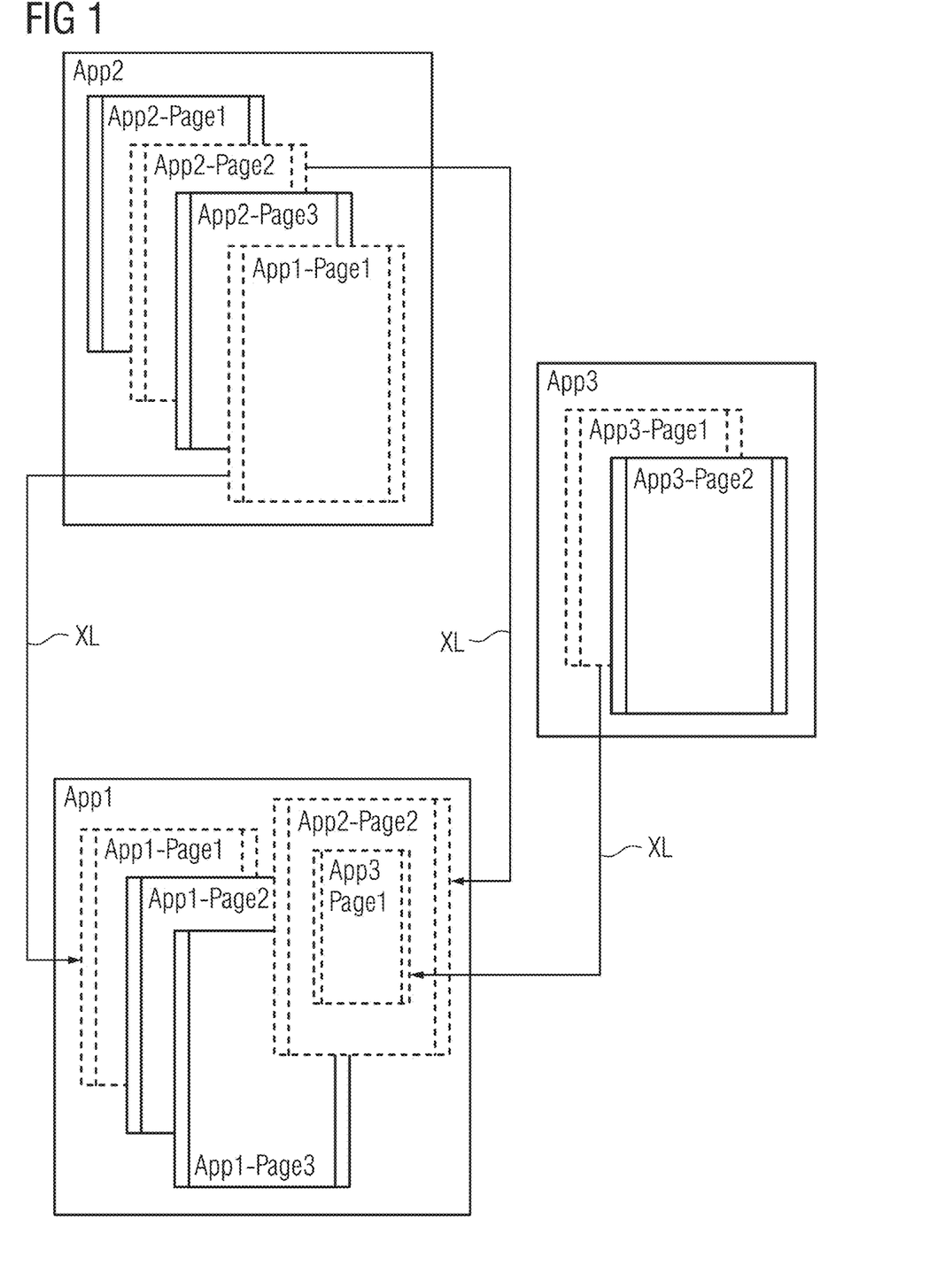
FIG. 1 shows a schematic diagram for illustrating the operation of a computer-implemented method for providing cross-linking between cloud-based HTML5 web-applications according to an embodiment of the present invention, focusing on the frontend part of the HTML5 based web-applications.

FIG. 1 shows an example of three different web-applications using the computer-implemented methods for providing cross-linking. In the illustrated specific example of FIG. 1 web service may comprise three different web-applications, App1, App2, App3. Each web-application App can host one or more webpages. A webpage of a web-application can be used by another web-application by calling a Uniform Resource Locator URL.

The Uniform Resource Locator URL comprises an URL extension with a set of additional URL parameters. Uniform Resource Locator URL with the URL extension provides autonavigation to a customized specific internal view of the activated provider webpage by the calling consumer web-application. Customization of the specific internal view is provided by a corresponding parametrization provided by the set of URL parameters.

In a possible embodiment, the set of URL parameters forming the URL extension comprises key-value pairs separated from each other by predefined separation characters as the Ampersand character "&". The set of URL parameters of the URL extension allows the customization of the views inside the destination webpage used from inside or outside of the respective web-application. The consumer web-application can call the Uniform Resource Locator URL with its URL extension implemented in a customized provider webpage (destination webpage) of a provider web-application to activate the customized provider webpage via a cross link XL. The URL parameters used by the consumer web-application to call the provider web-application webpage provide autonavigation to internal views of the provider web-application, i.e. destination web-application, such that the provider webpage displays either the full view or only a customized subset view of the webpage which is helpful in the context of the consumer web-application and achievable in selecting the according parameters for the URL which finally loads the provider web-application.

The customized specific internal view of the activated provider webpage is opened automatically on top of the calling web-application until the activated provider webpage is closed in response to a corresponding user command input via the user interface. The last state and context of the calling consumer web-application is kept as before the activation of the customized provider webpage of the provider web-application and can be used to recover automatically the original calling consumer web-application after the provider webpage of the provider web-application has been closed. This avoids pedantic back and forth navigation between UI pages of different web-applications (or different webpages within the same web-application).

A cross-linking can be provided between webpages hosted by the same web-applications or between webpages hosted by different web-applications. Further, the activated customized provider webpage of the provider web-application can in turn call itself a Uniform Resource Locator URL of another provider web-application activating a customized provider webpage of the other provider web-application thus achieving a nested (principle of) cross-linking XL between web-applications. The provider web-application can function also as a consumer web-application for another or for the same web-application.

In a preferred embodiment, the consumer web-application provides an activation mechanism which can be used by the user of the consumer web-application to call the Uniform Resource Locator URL with its URL extension. The activation mechanism can comprise in a possible embodiment a hyperlink on a webpage of the consumer web-application. The activation mechanism can also comprise a menu entry in a user interface option menu of the consumer web-application.

The activated provider webpage opened on top of the calling consumer web-application provides for a user interaction with the user via the user interface of the client device. In a possible embodiment user interaction with the underlying calling consumer web-application can be blocked automatically.

As soon as the customized specific internal view of the activated provider webpage opened on top of the calling consumer web-application is closed in response to a corresponding user command input by the user via the user interface, the customized specific internal view of the activated provider webpage will be automatically removed from a screen of the user interface and the underlying original consumer web-application is automatically displayed and interaction enabled again on the screen of the user interface. For instance, the user can click on a close button closing the activated provider webpage opened on top of the calling consumer web-application to return to the original consumer web-application.

In the illustrated example of FIG. 1 web-application App1 can be for instance a dose management application (or: "Dose" for short) which has a provider webpage. The first application App1 as shown in FIG. 1, i.e. the dose management application comprises in the illustrated example a first page (App1-Page1). This page App1-Page1 forms a provider webpage adapted to provide information to a consumer application.

For example, the provider webpage can comprise a dose scanner list displaying a scanner list containing 0 to n scanners and each scanner can provide an examination list with 0 to m examinations performed by the respective scanner. Each examination can in turn have 0 to n dose events (e.g. computer tomography CT scans). A dose event should be understood in particular to mean a medical imaging scan that deposits a certain dose of electromagnetic radiation within a portion of a patient's body, or an entry in a database signifying (and optionally quantifying) such a radiation deposition.

The provider webpage (producer component App1-Page1) providing the dose scanner list can comprise its own lifetime, state and context and can get deployed via parameterized URL into a runtime container such as an inline frame (or: iframe) dynamically. The provider webpage of the provider web-application is customized with URL parameters such that the scanner can be specified explicitly and the examination can also be specified explicitly by corresponding URL parameters. For example, the provider webpage can then display not the scanner list (invisible in this case) but only a single examination, in case the parameterized URL contains a single explicit scanner and single explicit exam as in this case. In another case, when the URL parameters are empty, a complete list of scanners can be displayed and a list of examinations will be displayed to the user on a screen of the user interface when a user selects a specific scanner inside the customized provider webpage interactively as soon as it has been activated by the calling consumer web-application, so the resulting visible view of the provider webpage is completely runtime-configured to the consumer's (i.e. a user's) needs.

In the illustrated example of FIG. 1, the second web-application App2 can be for instance a protocol management application which has a provider webpage. For instance, a provider webpage (App2-Page2) of the second web-application (protocol management application) can be a protocol scanner list providing webpage for displaying a scanner list containing 0 to n scanners, wherein each scanner provides a protocol list with protocol versions which can be used by this scanner to perform a modality MT such as computer tomography CT or magnetic resonance MR examinations.

Each protocol in turn can have 0 to n different protocol versions (such as CT head_w/wo.child). The providing webpage or producer component (App2-Page2, protocol scanner list) can also comprise its own lifetime, state and context and can also be deployed in a runtime container such as an iframe. The producer component can be customized with URL parameters such that the scanner can be specified explicitly and the protocol can also be specified explicitly by the URL parameters. In this case, the producer component or providing webpage displays no protocol scanner list but only a single protocol with all versions or just a single version of the protocol when the version is specified by additional URL parameters as well. In another use case when these parameters are empty, a complete list of scanners can be displayed and the list of protocols will be displayed only when the user selects a specific scanner inside the producer component interactively as soon as it has been activated.

For this reason it is then possible that the first web-application App1 (dose management application) navigates automatically internally into a specific detailed view (web-application App1-Page3) to show the used protocol which has been used for a specific examination of interest to the user. The user has for instance the possibility to use an options menu with an examinations list entry and may activate a detailed information view of the specific examination protocol parameters used. In this use case, the scanner model, the modality, the protocol name, the examination date (study date) are known such that the protocol scanner list can be called as a consumer inside the dose management application (i.e. web-application App1).

The call can be done via constructing the according URL for the producer component of the protocol management application and supplying the URL parameters of the URL extension. The result is that the protocol details are shown on top of the current dose management application App1 and the interactivity control of the user interface is handed over to the protocol management producer component until a detailed analysis of the underlying protocol has been finished by the user.

Without an embodiment of the invention, in the prior art the user would need to leave e.g. the dose management application and go to the protocol management application first and then navigate deeply into that protocol management application to find the right information detail. Afterwards, the user would need to again leave the protocol management application and to go back to the dose management application. However, in the meanwhile the dose management application would have lost its context because its UI (frontend of the web-application) would have been switched away in favor of the protocol management application. Finally the user would need to again navigate deeply into the dose management application to find the place where they were interrupting their work to complete the intended task. As a consequence, even to get some minor detail from a separate web-application, a lot of effort is needed in conventional systems until a user can proceed with the intended task in the consumer application.

The computer-implemented method according to an embodiment of the present invention allows for first level and higher level (recursive or nested crosslinking to an arbitrary level) cross-linking.

In the illustrated embodiment of FIG. 1, the second web-application App2 (protocol management application) comprises three individual webpages and may be currently working in webpage 3 (App2-Page3). While having the page3 on top of the screen of the user interface, the user can decide to open webpage 1 of the application 1 (App1-Page1) to get specific detailed information via a link available on webpage 3 of the second web-application (protocol management application, i.e. on App2-Page3). If the user decides to close the first page of the first web-application (App1-Page1), this page disappears from top of third page of the second web-application (App2-Page3) and its state and context is available as it was before the activation.

Beside such first level cross-linking the mechanism according to the present invention allows for a second level cross-linking, i.e. nested cross-linking. For example, the first web-application App1 (dose management application) comprising three individual webpages may currently work in webpage 3. While having webpage 3 on top, the user can decide to open the second page of the second web-application (App2-Page2) to get specific detailed information via a link available on the third webpage 3 of the first web-application (App1-Page3).

Furthermore, in the illustrated example while working in the second page of the second web-application (App2-Page2) the user decides to get a specific detail from the first webpage of the third application (App3-Page1) and activates it via a link available on the second page of the second web-application (App2-Page2). Additionally, the first web-application App1 can provide a certain functionality in a way such that it can be loaded via a link, i.e. App1-Page1.

If a user decides to close the first page of the third web-application (App3-Page1), this page disappears from top of second webpage of the second web-application (App2-Page2) and its state and context is still available as it was before the activation. Now a user decides to close the second page of the second web-application (App2-Page2), this page disappears from top of third page of the first web-application (App1-Page3) and its state and context is again available as it was before the activation.

The dashed web-pages which have the same name as the hosting web-application form components which are designed for reuse by external web-applications (consumer applications). For example, the first page of the first web-application (App1-Page1) can be designed as a provider component inside the first web-application App1. For this reason, it can be used in form of a consumer component inside the second web-application App2 as also illustrated in FIG. 1.

The provider webpage of the provider web-application (destination web-application) customized by the URL extension is hosted in a preferred embodiment in a runtime container which can be displayed on a screen of the user interface. The container can comprise a generic container which allows hosting of the component, for example in a UI container which comprises a pop-up window, an embedded window and/or a separate browser page.

The runtime container can be adapted to forward the URL parameters of the URL extension into the hosted provider webpage to provide the customized (parameterized) specific internal view of the provider webpage. The runtime container displayed on the screen of the user interface can be closed in a possible embodiment in response to a corresponding user command input via the user interface. For example, if the runtime container is a pop-up window, a pop-up window close item can for instance be provided at the upper right corner and can be clicked by the user to remove the pop-up window on the top to restore (or: recover) the underlying consumer web-application.

The dashed webpages which have a different name as the hosting web-application are components (consumer components) and can be designed by the using and hosting application and can be designed for reuse by an external web-application as a producer component. For example, the second webpage of the second web-application (App2-Page2) can be used as a consumer component inside the first web-application App1.

For integrating a component such as a hyperlink in a window of a user interface page or an entry of a user interface options menu in a window of user interface page (webpage) the consumer component can comprise an activator which starts using the provider component or provider webpage from within the consumer hosting application.

The activation mechanism can comprise a hyperlink on a webpage of the consumer web-application or a menu entry in a user interface option menu of the consumer web-application. The consumer component can provide a set of parameters which can be used to extend the Uniform Resource Locator URL. The URL can then be called in order to get the customized provider webpage of the provider web-application automatically activated and started as a result.

The started customized provider webpage customized and parametrized by the additional URL parameters is then opened automatically on top of the calling consumer web-application until the activated provider webpage is closed again in response to a corresponding user command input via the user interface. For instance, a user can press or click a close button. The last state and context of the calling consumer web-application is kept as before the activation of the customized provider webpage of the provider web-application. Accordingly, the maintained last state and context of the calling consumer web-application can be used to restore (or: recover) automatically the original calling consumer web-application as soon as the provider webpage of the provider web-application has been closed. The recovered hosting web-application can keep its state and context as it has been before activation of the producer component.

The computer-implemented method allows cross-linking of different cloud-based web-applications in order to leverage an internal parametrized view of the provider webpage of the provider web-application from within an internal view of the consumer application such that the consumer web-application is not impacted from a context switch when the provider web-application has been closed. The customized specific internal view of the activated provider webpage is opened automatically on top of the calling web-application so that the user experience of a user when working with the web-application is significantly enhanced.

The URL parameter implemented in the customized provider webpages enable the consumer web-application to open the provider web-application with the correct view on demand via the Uniform Resource Locator URL customized with the URL parameters. The computer-implemented method supports also multiple nested cross-linking of web-applications such that a consumer web-application can get a specific view inside of a provider web-application which in turn can behave as a consumer web-application activating another provider web-application.

A further advantage of the computer-implemented method according to an embodiment of the present invention is that it does not require any backend or cloud-based service. The invention is essentially based on the frontend part of the HTML5 web-application; the webservice is preferably not involved.

Each web-application can comprise at least one webpage including program code adapted to perform the computer-implemented cross-linking method according to an embodiment of the first aspect of the present invention.

The following illustrates an example code for defining a web-service with three web-applications App1, App2, App3, i.e. a dose management application (App1), a protocol management application (App2) and a usage web-application (App3) which can be crosslinked with each other using the computer-implemented method according to an embodiment of the first aspect of the present invention.

```
//--------------------------------
// general myway Base App URL
//--------------------------------
var mywayBaseAddress = 'https://webclient-
dev.test.myway.siemens.com';
//--------------------------------
// myway Dose App (App1)
//--------------------------------
var mywayDoseCrossAppPage = 'InternalAndExternalData-
ViewerDose';
var mywayDoseBaseAddress = mywayBaseAddress +
'/#/dose/';
var mywayDoseCrossAppAddress = mywayDoseBaseAddress +
mywayDoseCrossAppPage;
vm.crossAppUrlDose = mywayDoseCrossAppAddress + '?';
//--------------------------------
// myway Protocols App (App2)
//--------------------------------
var mywayProtocolsCrossAppPage = 'XApp/ProtocolDetail';
var mywayProtocolsBaseAddress = mywayBaseAddress +
'/#/protocols/';
var mywayProtocolsCrossAppAddress = mywayProtocols-
BaseAddress + mywayProtocolsCrossAppPage;
vm.crossAppUrlProtocols = mywayProtocolsCrossAppAddress
+ '?';
//--------------------------------
// myway Usage App (App3)
//--------------------------------
var mywayUsageCrossAppPage = 'ExamList';
var mywayUsageBaseAddress = mywayBaseAddress +
'/#/usage/';
var mywayUsageCrossAppAddress = mywayUsageBaseAddress +
mywayUsageCrossAppPage;
vm.crossAppUrlUsage = mywayUsageCrossAppAddress + '?';
```

In the following possible use cases for cross-linking XL are explained.

In the first use case 1 it is intended to display only a single examination of a single scanner with a scanner ID and a study instance UID for that examination (or: exam) in an examination table from a start date to an end date. The start date and end date can be set depending on the specific protocol version date range. The following options of the options menu item of the examination table are enabled:

```
doseEvents, doseViewer.
       var url = vm.crossAppUrlDose +
           ' startDate='            + dateFormaterServ-
       ice.formatDateTime(vm.filterApplied.fromDate) +
           ' &endDate='             + dateFormaterServ-
       ice.formatDateTime(vm.filterApplied.toDate) +
           ' &modality='             +
       vm.filterApplied.modalityType.Name +
           ' &scannerId=' +
```

```
       vm.selectedExamDetailsList[0].ScannerId +
           ' &studyInstanceUid=' + vm.selectedStudyUid +
           ' &menuItems=doseEvents,doseViewer';
       vm.enableSlidePanel = true;
       vm.crossAppUrl = $sce.trustAsResourceUrl (url);
   }
```

Further, in an internal application use case 2, a dose benchmarking page call is performed. The scanner list and examination list filtered for all scanners which have a RPID (RadLex Playbook ID (registered trademark)) parameter value in the examination table (from the start date to the end date) are displayed. When the RadLex (registered trademark) standard is mentioned herein, in particular the version 4.0 of the standard is referred to. Options such as "show-Protocols" or "showUsage" may indicate that the protocols management application or the usage web-application may be shown, respectively.

The start date and the end date can be set from the specific benchmarking quarter which is currently set in a filter area of a benchmarking webpage (in the dose management web-application). To illustrate this use case, the following options in the option menu item of the examination table are enabled: doseEvents, doseViewer, showUsage, showProtocols.

```
   $ (document).on('click', '.onCrossAppTooltipClick',
function (e) {
       $ (".k-tooltip").css("display", "none");
       vm.chart__ownMedianClick(e.target.value);
   });
   function chart__ownMedianClick(boxplotData) {
       var dates = help-
er . buildDateRangeFromQuarter(vm.filterApplied.benchmarkP
eriod.Id);
       vm.fromDate = dates[0];
       vm.toDate = dates[1];
       var boxPlotarray = boxplotData.split(',');
       var url = vm.crossAppUrlDose +
           ' startDate='             + vm.fromDate +
           ' &endDate='              + vm.toDate         +
           ' &modality='              +
vm.filterSelected.modalityType.Name +
           ' &RPID='                  + boxPlotarray[0] +
           ' &menuItems='             +
'doseEvents,doseViewer,showUsage,showProtocols';
       vm.enableSlidePanel = true;
       vm.crossAppUrl = $sce.trustAsResourceUrl (url);
   }
```

Next use case 3 illustrates also an external application use case. Therein, the provider web-application is the dose management web-application and the consumer web-application is the protocols management web-application.

It is intended to display only an examination list of a single scanner with a scanner ID filtered for all scanners which have a RPID parameter value in the examination table (from a start date to an end date). The start date and end date can be set from the specific protocols version date range. The following options in the options menu item of the examination table are enabled, i.e. doseEvents, doseViewer.

```
   v    ar url = vm.crossAppUrlDose +
           ' startDate='             + dateFormaterServ-
       ice.formatDateTime(vm.filterApplied.fromDate) +
           ' &endDate='              + dateFormaterServ-
       ice.formatDateTime(vm.filterApplied.toDate) +
           ' &modality='              +
```

```
     vm.filterApplied.modalityType.Name +
        ' &scannerId=' +
     vm.selectedProtocolDetailsList[0].ScannerId +
        ' &studyInstanceUid='     + vm.selectedStudyUid +
        ' &menuItems='            +
' doseEvents,doseViewer';
        vm.enableSlidePanel = true;
        vm.crossAppUrl = $sce.trustAsResourceUrl (url);
     }
```

In the next use case 4, another external application use case, the examination list in usage for a single examination is available in the dose management web-application in order to show usage data (series). A current study instance UID from the current examination in the dose management web-application is the used parameter.

```
        function op-
   tions_ShowCurrentExamInUsage(examDataItem) {
        var url = vm.crossAppUrlUsage +
           ' studyUid=' + examDataItem.StudyInstanceUid;
           ' &date=' + dataItem.StudyDate +
           ' &protocolName=' + dataItem.Protocol;
           vm.showSlideInPanelOfUsageExamList = true;
           vm.usageExamListUrl =
  $sce.trustAsResourceUrl (url);
        }
```

In the next use case 5, another external application use case, it is intended to display the protocol for one single examination as available in the dose management web-application in order to show protocol version data (protocol parameters). A current selected scanner ID and a current selected examination are used, together with a study instance UID, a study date and a protocol name from the current examination, as parameters.

```
        function op-
   tions_ShowCurrentSiemensCTProtocol (examDataItem) {
        vm.protocolsSlidePanelTitle = dataItem.Protocol;
        var url = vm.crossAppUrlProtocols +
           ' scannerId=' + dataItem.ScannerId +
           ' &date=' + dataItem.StudyDate +
           ' &protocolName=' + dataItem.Protocol;
           vm.showSlideInPanelProtocolsDetails = true;
           vm.protocolsDetailtUrl =
  $sce.trustAsResourceUrl (url);
```

As can be seen in the above illustrated use cases, the Uniform Resource Locator URL includes additional URL parameters comprising key-value pairs separated from each other by predefined separation characters, i.e. the Ampersand (&) operation character. The URL parameters provide autonavigation to the customized specific internal view of the activated provider webpage by the calling consumer web-application.

Figure 2:
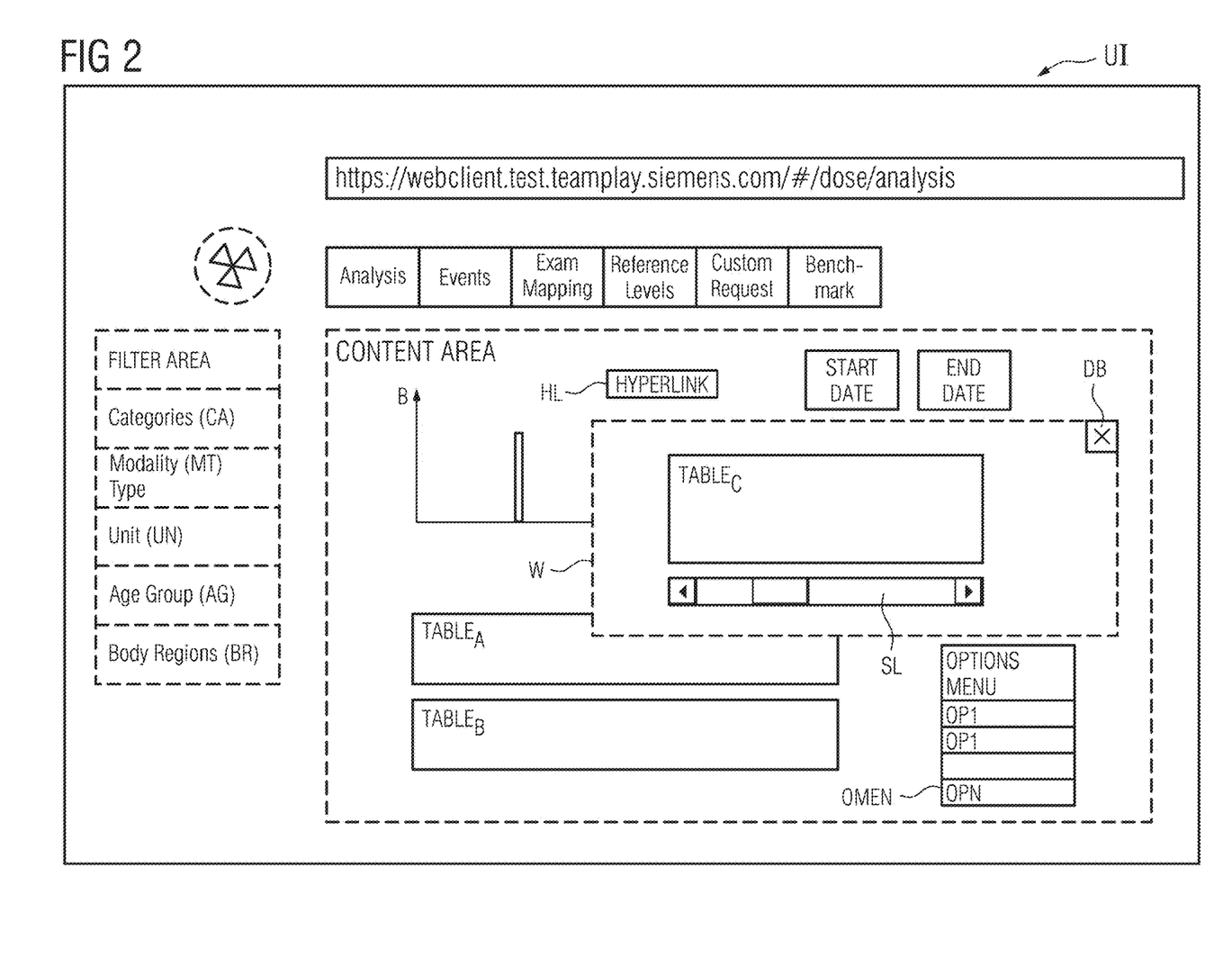
FIG. 2 shows an example specific view on a screen of a user interface for illustrating operation of a computer-implemented method for providing cross-linking between cloud-based web-application frontend according to an embodiment of the present invention.

FIG. 2 shows example information which can be displayed on a screen of a user interface UI of a client device used by a user to perform different user tasks. In the illustrated specific example, a web-application "Dose" (i.e. a dose management application) comprises different webpages, i.e. analysis, events, examination mapping, reference levels, customer requests and benchmarking.

Activation of the dose management web-application ("Dose") can be symbolized by a corresponding icon which can be e.g. displayed on the left upper corner of the screen of the user interface UI as shown in FIG. 2.

In the illustrated example, the dose management application the analysis webpage is initially opened and can for instance illustrate a diagram as well as two tables table A, table B in a content area of the webpage. On the left side of the screen, the user interface UI comprises a filter area which can be used by the user to filter the content according to filter criteria such as categories (CA1, modality types (MT), units (UN), age groups (AG) or investigated body regions (BR).

The content area of the webpage "analysis" can comprise user interface elements allowing the user to interact with the webpage analysis webpage of the web-application "dose". The content area can display parameters such as a start date and/or an end date, e.g. a time window for an investigation performed at a patient. The content area can also comprise some kind of activation mechanism. For instance, a hyperlink HL can be provided on the content area of the webpage "analysis" as illustrated in FIG. 2.

Further activation mechanisms can be provided as well such as a menu entry of a user interface menu of the consumer web-application as also illustrated schematically in FIG. 2. The option menu OMEN can be activated or opened in response to a user command input into the user interface UI. The opened user interface option menu comprises different options OP displayed to the user. These options can comprise activation mechanisms which can be used to call a Uniform Resource Locator URL with an URL extension. Also the displayed hyperlink HL can comprise an activation mechanism to call a Uniform Resource Locator URL with an URL extension.

In the illustrated example, the customized specific internal view of an activated provider webpage is opened automatically on top of the calling web-application, i.e. calling consumer web-application "Dose". In the illustrated example, table C is displayed on top of the content area of the analysis webpage in a pop-up window after an activation mechanism has been used. The provider webpage of the provider web-application customized by the URL extension is hosted in the illustrated embodiment in a runtime container displayed on the screen of the user interface UI.

The runtime container displayed on the screen of the user interface UI comprises a pop-up window W as shown in FIG. 2. This runtime container (pop-up window) displayed on the screen of the user interface UI can be closed in response to a corresponding user command input via the user interface UI. In the illustrated schematic example, the pop-up window W comprises a deactivation button DB in the upper right corner and can be used by the user to close the pop-up window W.

The customized specific internal view of the activated provider webpage (table C) opened on top of the calling consumer web-application (dose) is closed in response to the user command input by the user via the user interface UI (clicking the deactivation button DB, e.g. with a mouse). The customized specific internal view of the activated provider webpage (table C) is automatically removed from the screen of the user interface UI and the webpage of the recovered original consumer web-application is automatically displayed again on the screen of the user interface UI.

This can be achieved because the last state and context of the calling consumer web-application (here: "Dose") is kept as before the activation of the customized provider webpage of the provider web-application displayed in the runtime pop-up window. The computer-implemented method providing cross-linking between cloud-based web-applications allows for a much faster and more efficient navigation and collaboration between natively disjunct webpages of web-applications which are only sharing restricted domain data (e.g. study instance UID "StudyInstanceUID" in the medical domain).

The Uniform Resource Locator URL with the URL extension having a set of additional URL parameters can provide autonavigation, i.e. automatic navigation to a customized specific internal view of the activated provider webpage by the calling consumer web-application, e.g. to table C as illustrated in FIG. 2.

The customized specific internal view of the activated provider webpage can comprise inter-activity elements such as a slider SL as shown in FIG. 2. Accordingly, the user can interact with the activated provider webpage whereas interactivity with the webpage of the underlying consumer web-application is automatically blocked until the activated provider webpage is closed by the user by clicking for instance the deactivation button DB of the runtime container W.

The number and types of URL parameters used in the URL extension can vary depending on the use case. The uniform Resource Locator URL with the URL extension can be implemented in a programmed customized provider webpage of a provider web-application. The customization is achieved by the parametrization done via the URL parameters. The customization of the specific internal view of the activated provider webpage by the calling consumer web-application can concern content or information as well as the representation of the information on the screen of the user interface UI.

Accordingly, the customization can be adapted to the capacities of the user of the web-applications. The user can select in a possible embodiment web-applications "App" by clicking on responding web-application icons displayed on the user interface UI. Further as illustrated in FIG. 2, the user can activate a webpage such as "analysis" in a web-application such as the dose management application. The example shown in FIG. 2 is specific for purposes of illustration but the ideas and principles described therewith can be applied to a wide variety of different web-applications and/or webpages as well as configurations of the web-pages.

For example, in the illustrated specific example the activated customized provider webpage showing table C pops up on the top of the content area of the analysis webpage and covers the content area only partially. In other embodiments, the activated customized provider webpage opens on top of the calling web-application and may for instance cover completely content area of the calling consumer web-application. In a web service with different web-applications each having a varying number of different webpages can be customized and/or configured according to the specific requirements of the respective user of the case thus increasing significantly the operation efficiency of the respective web service. The web service can be provided on a cloud platform of a web service provider and is not necessarily important for the core of an embodiment of the present invention.

In the following, a complete code example is attached for illustration of at least one embodiment of the invention. Embodiments of the invention are not limited by the specific implementation or features shown in the code example. However, specific ways of implementation as described by the code example may be readily generalized to other methods according to an embodiment of the present invention.

```
//---------------------------------------------------------
// initialization
//---------------------------------------------------------
//-------------------------------
// general myway Base App URL
//-------------------------------
var mywayBaseAddress = 'https://webclient-dev.test.myway.siemens.com';
//-------------------------------
// myway Dose App (App1)
//-------------------------------
var mywayDoseCrossAppPage = 'InternalAndExternalDataViewerDose';
var mywayDoseBaseAddress = mywayBaseAddress + '/#/dose/';
var mywayDoseCrossAppAddress = mywayDoseBaseAddress + mywayDoseCrossAppPage;
vm.crossAppUrlDose = mywayDoseCrossAppAddress + '?';
//-------------------------------
// myway Protocols App (App2)
//-------------------------------
var mywayProtocolsCrossAppPage = 'XApp/ProtocolDetail';
var mywayProtocolsBaseAddress = mywayBaseAddress + '/#/protocols/';
var mywayProtocolsCrossAppAddress = mywayProtocolsBaseAddress + mywayProto-
colsCrossAppPage;
vm.crossAppUrlProtocols = mywayProtocolsCrossAppAddress + '?';
//-------------------------------
// myway Usage App (App3)
//-------------------------------
var mywayUsageCrossAppPage = 'ExamList';
var mywayUsageBaseAddress = mywayBaseAddress + '/#/usage/';
var mywayUsageCrossAppAddress = mywayUsageBaseAddress + mywayUsageCrossAppPage;
vm.crossAppUrlUsage = mywayUsageCrossAppAddress + '?';
//---------------------------------------------------------
// internal-app use case: dose ExamMapping page call
//
// display only the single exam of the single scanner with scannerId and Stud-
yInstanceUid for that exam in exam-table (from startDate to EndDate)
// startDate and endDate are set form the specific protocol's version date range
(but over-specified here in this use case!)
// enable the following options in the options-menue item of the exam-table:
doseEvents,doseviewer
```

```
//
//----------------------------------------------------------
        function label_ShowDoseDataClick(boxplotData) {
        var url = vm.crossAppUrlDose +
            ' startDate='           + dateFormaterServ-
ice.formatDateTime(vm.filterApplied.fromDate) +
            ' &endDate=' + dateFormaterServ-
ice.formatDateTime(vm.filterApplied.toDate) +
            ' &modality='                   + vm.filterApplied.modalityType.Name +
            ' &scannerId='              + vm.selectedExamDetailsList[0].ScannerId +
            ' &studyInstanceUid=' + vm.selectedStudyUid +
            ' &menuItems=doseEvents,doseViewer';
        vm.enableSlidePanel = true;
        vm.crossAppUrl = $sce.trustAsResourceUrl (url);
        }
//----------------------------------------------------------
// internal-app use case: dose benchmarking page call
//
// display the scanner-list & exam-list filtered for all scanners which have the
RPID-param value in exam-table (from startDate to EndDate)
// startDate and endDate are set form the specific benchmarking quarter which is
currently set in filter area of benchmarking page (in doseManagement App)
// enable the following options in the options-menue item of the exam-table:
doseEvents,doseviewer,showUsage,showProtocols
//
//----------------------------------------------------------
        $(document).on('click', '.onCrossAppTooltipClick', function (e) {
        $(".k-tooltip").css ("display", "none");
        vm.chart_ownMedianClick(e.target.value);
        });
        function chart_ownMedianClick(boxplotData) {
        var dates = help-
er.buildDateRangeFromQuarter(vm.filterApplied.benchmarkPeriod.Id);
        vm.fromDate = dates[0];
        vm.toDate = dates[1];
        var boxPlotarray = boxplotData.split(',');
        var url = vm.crossAppUrlDose +
            ' startDate='       + vm.fromDate           +
            ' &endDate=' + vm.toDate       +
            ' &modality='           + vm.filterSelected.modalityType.Name +
            ' &RPID='       + boxPlotarray[0] +
            ' &menuItems='           +
'doseEvents,doseviewer,showUsage,showProtocols';
        vm.enableSlidePanel = true;
        vm.crossAppUrl = $sce.trustAsResourceUrl(url);
        }
//----------------------------------------------------------
// external-app use case: from protocols.analysisView page call (Provider = Dose;
Consumer = Protocols)
//
// display only exam-list of the single scanner with scannerId filtered for all
scanners which have the RPID-param value in exam-table (from startDate to
EndDate)
// startDate and endDate are set form the specific protocol's version date range.
// enable the following options in the options-menue item of the exam-table:
doseEvents,doseviewer
//
//----------------------------------------------------------
        function chart_boxplotShowCasesClick(boxplotData) {
        var url = vm.crossAppUrlDose +
            ' startDate='       + dateFormaterServ-
ice.formatDateTime(vm.filterApplied.fromDate) +
            ' &endDate=' + dateFormaterServ-
ice.formatDateTime(vm.filterApplied.toDate) +
            ' &modality='                   + vm.filterApplied.modalityType.Name +
            ' &scannerId='               + vm.selectedProtocolDetailsList[0].ScannerId +
            ' &studyInstanceUid=' + vm.selectedStudyUid +
            ' &menuItems='           + 'doseEvents,doseviewer';
        vm.enableSlidePanel = true;
        vm.crossAppUrl = $sce.trustAsResourceUrl(url);
        }
//----------------------------------------------------------
// external-app use case: mywayDoseCrossAppPage page called (Provider = Usage;
Consumer = Dose)
//
// display the exam list in usage for 1 single exam as available in dose in order
to show usage data (series)
// current studyInstanceUid from the current exam in dose is the parameter
//
```

```
//---------------------------------------------------------
    function options_ShowCurrentExamInUsage(examDataItem) {
      var url = vm.crossAppUrlUsage +
        ' studyUid=' + examDataItem.StudyInstanceUid;
        ' &date=' + dataItem.StudyDate +
        ' &protocolName=' + dataItem.Protocol;
      vm.showSlideInPanelOfUsageExamList = true;
      vm.usageExamListUrl = $sce.trustAsResourceUrl (url);
    }
//---------------------------------------------------------
// external-app use case: mywayDoseCrossAppPage page called (Provider = Proto-
cols; Consumer = Dose)
//
// display the protocol in protocols for 1 single exam as available in dose in
order to show protocol-version data (protocol paramaters)
// current selected scannerId and current selected exam with studyInstanceUid's
study-date and protocol-name from the current exam in dose use as parameters
// (constraint: will only be called in case of Modality = CT and ScannerModel=
Siemens!)
//---------------------------------------------------------
    function options_ShowCurrentSiemensCTProtocol (examDataItem) {
      vm.protocolsSlidePanelTitle = dataItem.Protocol;
      var url = vm.crossAppUrlProtocols +
        ' scannerId=' + dataItem.ScannerId +
        ' &date=' + dataItem.StudyDate +
        ' &protocolName=' + dataItem.Protocol;
      vm.showSlideInPanelProtocolsDetails = true;
      vm.protocolsDetailtUrl = $sce.trustAsResourceUrl (url);
    }
```

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A computer-implemented method for providing cross-linking between cloud-based HTML5 web-applications, the computer-implemented method comprising:

activating, by a consumer web-application calling a Uniform Resource Locator (URL) implemented in a customized provider webpage of a provider web-application, the customized provider webpage of the provider web-application, via a cross link;

providing dynamic configurable autonavigation to a customized specific internal view of the customized provider webpage activated by the calling of the consumer web-application, the URL including an URL extension with a set of additional URL parameters;

automatically opening the customized specific internal view of the activated provider webpage, on top of calling of the consumer web-application, until the activated provider webpage is closed in response to a corresponding user command input, via a user interface (UI), a last state and context of the calling consumer web-application being kept before the activation of the customized provider webpage of the provider web-application;

disabling user interaction with the calling consumer web-application without closing the calling consumer web-application;

automatically restoring, using the last state and context of the calling consumer web-application, an original calling consumer web-application after the provider webpage of the provider web-application is closed; and re-enabling user interaction with the calling consumer web-application in response to the automatically restoring the original calling consumer web-application, wherein the calling consumer web-application is a dose management application and the customized specific internal view includes a dose scanner list.

2. The computer-implemented method of claim 1, wherein the cross-linking is provided between webpages hosted by a same web-application or between webpages hosted by different web-applications.

3. The computer-implemented method of claim 1, further comprising:
calling, by the customized provider webpage activated, of the provider web-application, a URL of another provider web-application activating a customized provider webpage of the another provider web-application, to provide a nested cross-linking of the web-applications.

4. The computer-implemented method of claim 1, further comprising:
providing, by the consumer web-application, an activation mechanism for use by a user of the consumer web-application to call the URL, with the URL extension.

5. The computer-implemented method of claim 4, wherein the activation mechanism includes a hyperlink (HL) on a webpage of the consumer web-application or a menu entry in a user interface option menu of the consumer web-application.

6. The computer-implemented method according of claim 1, wherein the customized provider webpage activated opened on top of the calling consumer web-application provides user interaction with a user via the UI.

7. The computer-implemented method of claim 1, further comprising:
in response to the customized specific internal view of the customized provider webpage activated opened on top of the calling consumer web-application being closed in response to a corresponding user command input by a user via the UI,
removing the customized specific internal view of the activated provider webpage from a screen of the UI, and
displaying the original consumer web-application restored on the screen of the UI.

8. The computer-implemented method of claim 1, wherein the provider webpage of the provider web-application customized by the URL is hosted in a runtime container displayed on a screen of the UI.

9. The computer-implemented method of claim 8, further comprising:
forwarding, by the runtime container, the URL parameters of the URL extension into the provider webpage hosted, to provide the customized specific view of the customized provider webpage.

10. The computer-implemented method of claim 8, wherein the runtime container displayed on a screen of the UI includes a pop-up window, an embedded window or a browser page.

11. The computer-implemented method of claim 8, further comprising:
closing the runtime container displayed on the screen of the UI in response to a corresponding user command input via the UI.

12. The computer-implemented method of claim 8, wherein the runtime container includes an iframe for a HTML5 web-application.

13. The computer-implemented method of claim 1, wherein the set of URL parameters includes key-value pairs separated from each other by predefined separation characters.

14. A non-transitory computer readable medium storing a web-application comprising:
at least one webpage including program code, adapted to perform the computer-implemented method of claim 1.

15. A server, comprising:
a memory storing computer-executable instructions; and
at least one processor configured to execute the computer-executable instructions to cause the server to host a web service provided by at least one web-application of claim 14.

16. The computer-implemented method of claim 2, further comprising:
calling, by the customized provider webpage activated, of the provider web-application, a URL of another provider web-application activating a customized provider webpage of the another provider web-application, to provide a nested cross-linking of the web-applications.

17. The computer-implemented method of claim 2, further comprising:
providing, by the consumer web-application an activation mechanism for use by a user of the consumer web-application to call the URL, with the URL extension.

18. The computer-implemented method of claim 17, wherein the activation mechanism includes a hyperlink (HL) on a webpage of the consumer web-application or a menu entry in a user interface option menu of the consumer web-application.

19. The computer-implemented method of claim 2, wherein the provider webpage activated, opened on top of calling of the consumer web-application, provides user interaction with a user via the UI.

20. The computer-implemented method of claim 2, further comprising:
in response to the customized specific internal view of the customized provider webpage activated, opened on top of the calling consumer web-application being closed in response to a corresponding user command input by a user via the UI,
removing the customized specific internal view of the activated provider webpage from a screen of the UI, and
displaying the original consumer web-application restored, again on the screen of the UI.

* * * * *